United States Patent [19]
Cartier et al.

[11] Patent Number: 6,111,654
[45] Date of Patent: Aug. 29, 2000

[54] METHOD AND APPARATUS FOR REPLACING OR MODIFYING A POSTSCRIPT BUILT-IN FONT IN A PRINTER

[75] Inventors: Brian George Cartier; Scott Timothy Cramer; Edward William Yohon, Jr., all of Lexington, Ky.

[73] Assignee: Lexmark International, Inc., Lexington, Ky.

[21] Appl. No.: 09/295,211

[22] Filed: Apr. 21, 1999

[51] Int. Cl.[7] .............................. B41B 15/00; B41J 15/00; G06F 15/00; H04N 1/00; H04N 1/40
[52] U.S. Cl. .................... 358/1.16; 358/1.1; 358/1.17; 358/404; 358/444
[58] Field of Search ............................. 358/1.1, 1.16, 358/1.17, 444, 404

[56] References Cited

U.S. PATENT DOCUMENTS

| | | |
|---|---|---|
| 4,837,712 | 6/1989 | Shibamiya . |
| 5,148,293 | 9/1992 | Miyachi . |
| 5,233,683 | 8/1993 | Sasaki . |
| 5,239,621 | 8/1993 | Brown, III et al. .................... 358/1.16 |
| 5,367,618 | 11/1994 | Ishida . |
| 5,410,640 | 4/1995 | Morikawa et al. . |
| 5,528,742 | 6/1996 | Moore et al. . |
| 5,542,050 | 7/1996 | Onozawa . |
| 5,617,525 | 4/1997 | Sugaya . |
| 5,671,246 | 9/1997 | McIntyre . |

Primary Examiner—Joseph Mancuso
Assistant Examiner—Twyler Lamb
Attorney, Agent, or Firm—Frederick H. Gribbell; D. Brent Lambert

[57] ABSTRACT

An improved printer is provided in which one of the "built-in" resident fonts can be effectively replaced by downloading from a host computer (into either Flash memory or the printer's hard disk drive) new or modified data under the same font descriptor as the built-in font. After the replacement font has been received by the printer and stored into a non-volatile memory storage device, the user can choose whether to use the replacement font or the built-in font for a particular document, by use of a printer setting named the "Font Priority." This Font Priority setting has the values of either "Resident" or "Flash/Disk." When the Font Priority setting is set to "Resident," the printer preserves Adobe compatibility by having the PostScript interpreter search the virtual memory first to locate a font that is requested by a print job. If the particular font is found, no other font memory storage device is searched and the copy of the font reference in the virtual memory is selected. If the Font Priority is set to "Flash/Disk," the PostScript interpreter will still search for the requested font in virtual memory. However, if the interpreter finds that a resident font has been requested, then the non-volatile memory storage devices are searched for a replacement version of that font. If a replacement font is found, it is loaded into virtual memory and will now be used to print the document (instead of the original built-in resident font).

23 Claims, 4 Drawing Sheets

METHOD AND APPARATUS FOR REPLACING OR MODIFYING A POSTSCRIPT BUILT-IN FONT IN A PRINTER

TECHNICAL FIELD

The present invention relates generally to image forming equipment and is particularly directed to a printer of the type which can print characters having a font that replaces a "built-in" resident font of the printer. The invention is specifically disclosed as a method for storing a replacement font on a non-volatile memory device of a printer, in which the replacement font uses the identical font name/descriptor as a built-in resident font already residing in the printer, and in which the user can select the replacement font for use in a print job.

BACKGROUND OF THE INVENTION

There are numerous fonts that are resident within a printer. In many conventional printers known in the prior art, these fonts are stored in non-volatile memory, then loaded into virtual memory (i.e., RAM) when the printer is initialized. In these conventional printers, any change to a resident font is lost the next time the printer is initialized. If a modified font or "replacement" font by the same name was downloaded to the printer's non-volatile memory storage device from a host computer, it would not be stored in the virtual memory and used by the printer to create bitmaps for any character fonts. Instead, the printer would always look to the virtual memory to find that font (by that same name), and the original resident font data would always be used to print the document, ignoring the downloaded modified font or replacement font.

U.S. Pat. No. 5,367,618 (by Ishida) discloses a document processing apparatus that includes a "transmitting unit" and a "receiving unit," which correspond, respectively, to a host computer and a printer. The host computer selects a particular font data that corresponds to character codes contained in document data for a print job that is to be later transmitted to the printer. Before sending the document data, it is determined whether or not the correct font data set has already been installed in the printer. If not, then the host computer transmits the selected font data to the printer, where it is temporarily stored so that this font data can be used for printing the document data after that document data has been received from the host computer. In one embodiment, the font data received by the printer, and temporarily stored in the printer's memory, is automatically deleted after the print job has been completed.

U.S. Pat. No. 5,148,293 (by Miyachi) discloses an image forming apparatus that includes a memory area that contains an erasable font pattern. Earlier laser printers contain "basic" font patterns, usually stored in a ROM, and these basic font patterns are used to derive bold fonts, italic fonts, and modified fonts (that are rotated). Since these derived fonts occupy a certain portion of RAM, the amount of the buffer area for expanding an image into a bitmap is reduced. In the Miyachi invention, the RAM memory area of the printer is divided into two areas: (1) a buffer area to hold derived fonts, and (2) a buffer area to hold expanded bit image data (e.g., for bitmaps). When the memory area provided for the bit image expansion is filled up during the generation of the bitmap, the Miyachi invention looks at the "modified font pattern storage area" to see if there are any unused portions that can be re-allocated for other purposes. If there are portions of the modified font pattern storage area that are unused, then these portions will be allocated to hold further bitmap information while the bit image is being expanded.

U.S. Pat. No. 5,410,640 (by Morikawa) discloses a font management system that includes a font memory which stores a plurality of fonts, each having a plurality of attributes. The system also uses RAM which contains a "priority register table." A "font selection code" is transmitted from a host computer to the printer, and this code contains attribute information that is used to select a single font from among the plurality of available fonts. The attribute information contained in the font selection code is compared to attribute information stored in the font memory in the order of priorities of the fonts stored in the system RAM. The system can select at high speed a desired font having the correct attribute information, as contained in the font selection code. Since the comparison of the attributes is performed in the order of respective priority, a font having certain attributes can be selected within a comparatively short time period. Since it is likely that different priority data are requested for a certain font, including the font point size and the font type, the particular font data having the higher priority will be selected at a high speed. The user is permitted to select the priority of the various font types and other font characteristics, and therefore, the most common font set would be most quickly selected in normal circumstances at a host computer used by that particular user.

U.S. Pat. No. 5,542,050 (by Onozawa) discloses a font information transfer system that uses a workstation and a printer, in which both new and previously-defined fonts can be sent from the workstation to the printer. In earlier systems if new font characters are desired, the general practice was to render such new characters at the workstation and send a bitmap to the printer; however, this required a large amount of data to be sent over the network between the workstation and the printer. The Onozawa printer is provided with a "character development means" that can create a brand new characters based upon data received from the workstation. At the same time, the printer includes a "font registration means" so that previously-defined characters can be printed merely by sending "code data" of that particular character to the printer. If a new character is desired, the workstation can extract "basic font data" of an existing character and allow a user to make changes to that character while confirming the newly developed character on the monitor. Once the user has corrected any errors, the font is registered in a "font registration means" and a number called "attestation data" along with a name is registered in the "font registration means." In this situation, not only the character code must be sent to the printer, but also "procedure data" and "attestation data" must be transmitted to the printer. Once this information is received at the printer, it is stored in a "font registration means" and the character code and layout information are stored in the printer's "code memory." Now that the new font character has been registered in the printer, the "character development means" in the printer can generate the font from basic font data stored in the printer's font data memory. Since the new character has been generated and stored in the printer, the workstation can call for that character to be printed later by only sending the "attestation data" to the printer. By use of the Onozawa invention, a new character can be printed by sending only the character's code data, font generation procedure data, and attestation data. It is not necessary to transmit the document in bitmap image data form from the workstation. Of course, each new character that is to be printed must have a character code first defined at the workstation, and then registered both at the workstation and later at the printer. This would not be considered a resident font since a new code name is created for each new character that is to be created and printed.

U.S. Pat. No. 5,239,621 (by Brown) discloses a printer having a "Flash memory" that stores fonts and macros, under operator control. The Flash memory comprises an electrically erasable programmable read only memory (EEPROM). Since the Flash memory is non-volatile, fonts or macros that are downloaded to the printer can be stored and, even after a power interruption, retrieved for later use. Brown also discloses a printer that has the capability of responding to more than one printing language, and can store downloaded information relating to more than one language. If the print language is "Postscript™" and particular fonts are stored for use with Postscript, then the printer has a particular order that it uses to search for such fonts when these fonts are called for in a print job. In the Postscript scenario (i.e., for PostScript Level 1), the search order is: RAM, Flash, Cartridge, Resident, and Disk. If the printing language is "PCL5" or "PPDS," then the search order for fonts and macros in the printer is as follows: RAM, Flash, Cartridge, and Resident.

U.S. Pat. No. 5,617,525 (by Sugaya) discloses an image output device that converts character codes into character patterns in advance of printing, and stores these character patterns in a font cache memory. When one of the character codes is received as a printing instruction, the pre-converted character pattern is used for printing. While much of this invention is prior art, one of its improvements is that it can identify character dot patterns that are prepared using different font scalers. The Sugaya printer includes a first font memory used to store an outline font to be used by a first font scaler, and a second font memory that stores an outline font to be used by a second font scaler. A cache memory is included to store character patterns to be generated based upon the outline fonts stored in the first and second font memories. Other memory space is available for the typical receive buffer, page buffer, and bitmap memory. The character patterns generated by the first and second font scalers are stored in a "pattern area," and the conversion information relative to the character patterns are stored in an "information area." This information area stores font scaler information (which is an identification number representing the composing method of outline font or scalable font) which is also dependent on the font of each independent company's format and each independent character design, and which requires a corresponding magnification change and hardware or software to develop this information into a dot pattern. The information area also includes a character set identifier (that represents the character style, such as "Gothic"), a registered character code, and a character size of the character pattern (defined by its width and height). The character set can also be further defined by parameters such as character pitch, its orientation, the graphic set (e.g., ASCII), and the typeface), and this corresponds to characters of a code system within the font group. In one embodiment, when characters are input to the printer, the system software determines whether the character pattern generated by the same font scaler is either stored or not stored in the font cache memory. If it is not stored, either the first font scaler or the second font scaler is selected according to the font scaler information that is contained with the character data. When this occurs, the appropriate font scaler is used to generate a new character pattern based upon the "read outline font," and the new character pattern is registered in the cache memory. If the character pattern identifies the "same" font scaler information, then the system software determines whether a "same" character set is instructed. If NO, then a new character pattern is generated. If YES, then the system software determines whether a "same" character code is instructed. If NO, then a new character pattern is generated, and if YES, the system software determines whether or not a character of the same size is instructed. If the answer is YES, a corresponding character pattern is read from the font cache memory and is written into the bitmap memory.

Different printer page description languages ("PDL's") such as PCL or PostScript have previously defined rules for locating and selecting resources to satisfy a job's application/driver resource request. For example, an application/driver may request that a particular print job be printed using legal size paper. During processing of this example print job, most PDL's would execute a type of search algorithm to locate an input source with legal size print media. At the conclusion of the search algorithm, an input source is selected by the PDL (i.e., interpreter) processing the print job.

The criteria used for algorithms vary greatly among different PDL's, although paper handling search algorithms are well known in the printing industry. For example, if legal sized media is requested and but not found in a particular set of available input sources, then the PDL "PCL 5e" will choose an input source that supports legal size media and the printer prompts the user to change that particular input source to "legal" paper size. On the other hand, the PostScript PDL may be configured to select an input source that contains a size of print media that is closest to legal size paper, then scale the printed page to fit the actual size of the media in the selected input source.

PDL algorithms to locate font resources also exist, however, these algorithms are less widely known. For example, the PostScript interpreter found in conventional printers manufactured by Lexmark International, Inc. is designed to be compatible with Adobe PostScript Language Level 2, Version 2016. To maintain compatibility and maximize performance when the PostScript interpreter is initialized in a conventional Lexmark printer, a listing of all the PostScript resident fonts stored in the printer is loaded into PostScript's virtual memory (which is an allocated portion of the printer's RAM system). Thus when PostScript receives a print job from the host computer which requests a "resident font," the PostScript PDL (i.e., the PostScript interpreter) can easily locate and select the correct font since a font entry already exists in the virtual memory. If a font is requested from an application/driver that is not a resident font, the PostScript interpreter does not find an entry in the virtual memory, and then executes a search among the font storage devices (including Flash RAM and disk drives) to locate the requested font.

The PostScript PDL font search algorithm is satisfactory as long as all of the fonts stored in the printer (i.e., both resident fonts in RAM as well as fonts stored on disk drives or other storage devices) each have a unique "font name" which is used to request the font. This unique name prevents the PostScript interpreter from selecting the wrong font. However, the PostScript interpreter font search algorithm is not satisfactory if a user is required to modify or to replace a "built-in" resident font. The PostScript interpreter allows a user to store a modified copy of a resident font on a font storage device, however, since the resident copy always forces the interpreter to load an entry in virtual memory (i.e., RAM) which references the resident copy of the font, the modified copy of the font residing on the font storage device cannot be selected by PostScript.

It would be an improvement in printer performance if a user could modify or replace a built-in resident font, and then later have that modified "replacement" font be used to print characters for an actual print job.

SUMMARY OF THE INVENTION

Accordingly, it is a primary advantage of the present invention to store a replacement font having the same font descriptor as a built-in resident font in a non-volatile memory device and to allow a user, either through the printer's front panel or the keyboard of a host computer, to choose whether the replacement font or the built-in resident font will be used in printing a particular print job. It is a further advantage of the present invention to use a built-in font of a particular font descriptor that is stored in a printer's virtual memory unless a user has selected an alternative memory device for storing a replacement font of the same particular font descriptor, but generating at least one character of different bitmap font data, in which case the printer automatically searches the alternative memory device to find the replacement font and, once found, uses the associated replacement font data for printing a print job.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved printer is provided in which one of the "built-in" resident fonts can be modified or substituted for, and downloaded from a host computer into either Flash memory or the printer's hard disk drive. This modified (or "replacement") font will preferably have the same font name (i.e., font "descriptor") as one of the built-in resident fonts. After the replacement font has been received at the printer, and stored into the printer's non-volatile memory devices, the user can choose whether to use the replacement font or the built-in font for a particular document, by use of a printer setting named the "Font Priority." This Font Priority setting has the values of either "Resident" or "Flash/Disk." The Font Priority in the preferred embodiment can be changed through four different interfaces: (1) an NPAP command, (2) the printer's front panel Ready Menu Group (the "PostScript Menu" setting), (3) a PJL command, or (4) a PostScript Level 2 System Parameter.

A conventional PostScript Level 2 interpreter will not allow a modified or replacement copy of a "built-in" resident font to be used by a particular print job, since the resident copy always forces the interpreter to load an entry into virtual memory (i.e., RAM) which references the built-in resident copy of the font, instead of the "new" or "replacement" copy of that same font. The present invention eliminates this problem by offering an optional user-selectable searching algorithm called "Font Priority," which has the two possible values listed above: a "Resident" value or a "Flash/Disk" value.

When the Font Priority setting is set to "Resident" in the present invention's printing system, the printer's PostScript interpreter preserves Adobe compatibility by having the PostScript interpreter search the virtual memory first to locate a font that is requested by a print job. If the particular font is found, no other font memory storage device is searched and the copy of the font reference in the virtual memory is selected. If the Font Priority is set to "Flash/Disk," the PostScript interpreter will still search for the requested font in virtual memory. However, if the interpreter finds that a resident font has been requested, then the non-volatile memory storage devices are searched for a replacement version of that font. If a replacement font is then found, it is loaded into virtual memory and will now be used to print the document (instead of the original built-in resident font). To retain the value of the Font Priority printer setting when the power is turned off to the printer, the value of the Font Priority is stored in the printer's non-volatile memory ("NVRAM").

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
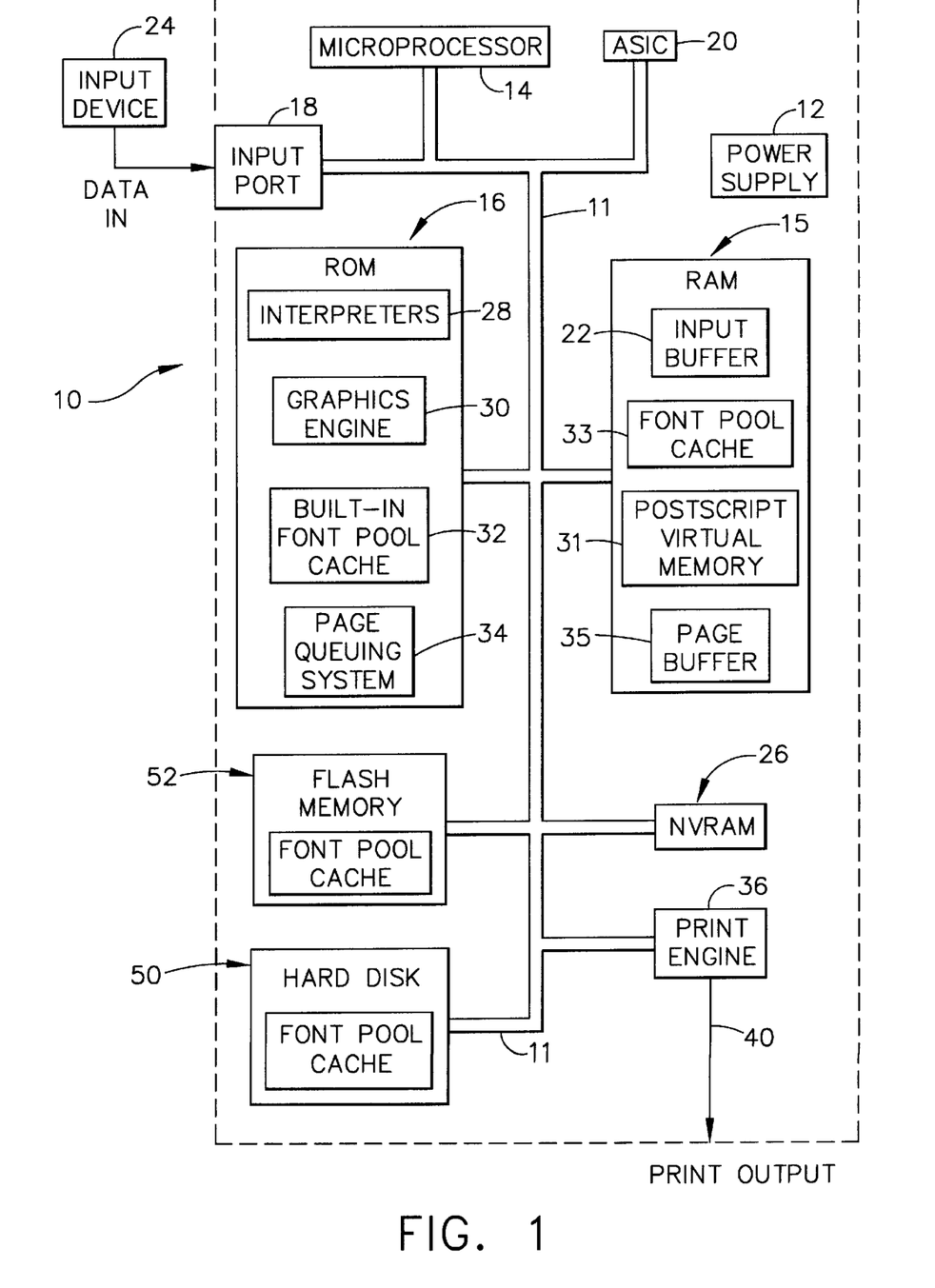
FIG. 1 is a block diagram of the major components of a printer, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM) 15, which is divided by software operations into several portions for performing several different functions.

Laser printer 10 also contains at least one input port, or in many cases several types of input ports, as designated by the reference numeral 18. Each of these ports would be connected to a corresponding input buffer, generally designated by the reference numeral 22 on FIG. 1. Each port 18 would typically be connected to an output port of either a personal computer (PC) or a workstation (WS) (designated on FIG. 1 as an "input device" 24) that would contain a software program such as a word processor or a graphics package or computer aided drawing package, or to a network that could be accessed by such a PC or WS. Laser printer 10 preferably will also contain an Application Specific Integrated Circuit (ASIC) 20, which typically contains a large number of programmable logic circuits.

Once text or graphical data has been received by input buffer 22, it is commonly communicated to one or more interpreters designated by the reference numeral 28. A common interpreter is PostScript™, which is an industry standard used by many laser printers. To speed up the process of rasterization, a font pool and typically also a font cache are stored in memory within most laser printers, and these font memories are designated by the reference numeral 32, 33, 50 and 52 on FIG. 1. Such font pools and caches supply bitmap patterns for common characters so that a graphics engine 30 can easily translate each such character into a bitmap using a minimal elapsed time.

Once the data has been rasterized, it is directed by a page queuing system 34 into a page buffer, which is a portion of RAM designated by the reference numeral 35. In a typical laser printer, an entire page of rasterized data is temporarily stored by the page queuing system 34 in the page buffer 35. The data within the page buffer 35 is communicated in real time to a print engine designated by the reference numeral 36. Print engine 36 includes a laser light source within its printhead (not shown), and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers. For ease of illustrating the present invention, the various busses used within printer 10 are grouped on FIG. 1 into a single bus pathway, designated by the reference numeral 11.

One way to enhance the performance of a printer (such as printer 10) would be to add optional non-volatile memory devices. In a Lexmark laser printer, for example, two additional types of non-volatile memory devices are available, including a hard disk drive at the reference numeral 50, and a Flash memory at the reference numeral 52. A hard disk drive can hold a tremendous amount of information, and relatively recent versions of a Lexmark OPTRA® printer can contain a 2.1 Gbyte capacity hard disk drive. Flash memory usually refers to a special type of EEPROM, and Flash memory capacity is typically much smaller than a hard disk drive's capacity, however, it is much faster. On relatively recent Lexmark OPTRA printers, the Flash memory options are for sizes 1 Mbyte, 2 Mbyte, or 4 Mbyte in capacity.

The font pool and font cache at 32 represent font information that includes a font name (i.e., font "descriptor") and also font character data (which may be bitmaps of pixel or pel data for each individual character of a font character set). This font pool and font cache information is preferably stored in RAM, Flash memory, or on a disk drive (such as hard disk drive 50).

During initialization of PostScript Level 2, the "resident" (i.e., "built-in") font descriptors located in the ROM font pool (i.e., the built-in font pool cache 32) are copied into PostScript's "virtual memory" (or "VM"), which comprises a portion of the RAM 15, and is designated on FIG. 1 by the reference numeral 31. This virtual memory 31 comprises a particular portion of the printer's entire random access memory system (i.e., RAM 15) that is allocated for storing the PostScript font descriptors within the printer.

When needed, additional fonts can easily be downloaded and stored onto the hard disk drive 50, or Flash memory 52. This font data will then be made available to the interpreters 28, as needed. The PostScript Level 2 interpreter will not search for a modified or replacement copy of a built-in font on disk or Flash to be used by a particular print job. The present invention eliminates this problem by offering an optional user-selectable searching algorithm called the "Font Priority" attribute. This attribute or setting has two values in its "value list," a "Resident" value and a "Flash/Disk" value. The factory default value stored in ROM for a printer using the present invention preferably sets the Font Priority to the "Resident" value.

When the Font Priority setting is set to "Resident" by the present invention's new features, the PostScript interpreter preserves Adobe compatibility, and performance is maximized. This is accomplished by having the PostScript interpreter search the virtual memory first to locate a font that is requested by a print job. Searching virtual memory in RAM is faster than searching the Flash or disk memories. If the font is found, no other font memory storage device is searched and the font in the virtual memory is selected. However, if Font Priority is set to Flash/Disk, when the PostScript interpreter processes a print job which requests a resident font, it will search the non-volatile memory devices (also sometimes referred to as non-volatile memory storage devices). If the requested font is located on one of the two non-volatile font memory devices, then the font found on the non-volatile memory device is used.

To retain the value of the Font Priority printer setting when the printer's power is turned off, the value of the Font Priority is stored a non-volatile memory location called "NVRAM," which is designated by the reference numeral 26. This non-volatile RAM is most likely (using today's technology) an EEPROM integrated circuit chip. The factory default value stored in ROM for a printer using the present invention preferably sets the Font Priority to the "Resident" value.

A user or system administrator using a host computer or the printer's operator panel may modify the Font Priority printer setting through one of four interfaces available in a preferred Lexmark printer constructed according to the principles of the present invention. These interfaces are: (1) an NPAP command, (2) a front panel Ready Menu Group ("PostScript Menu") entry at the printer's front panel display and key pad, (3) a PJL (i.e., Printer Job Language) command, or (4) a PostScript Level 2 system parameter.

Most printer settings, including "Font Priority," have a uniquely-defined NPAP identifier. This identifier is used with both NPAP Query and Modification commands to either query or modify the value (i.e., either the "Resident" or "Flash/Disk" value) of Font Priority.

A user may view and modify the Font Priority setting by accessing this setting in the "PostScript Menu" of the printer's front panel. The values displayed for the Font Priority setting are "Resident" and "Flash/Disk." If no non-volatile memory device is installed on a particular printer, then the Font Priority setting preferably is not displayed on the front panel display.

The PJL language is a high level printer language that can be used to query or modify the value of certain printer settings. For use with the present invention, a new Environment Variable is created to query or modify the Font Priority setting.

The PostScript interpreter may access this setting using the "SearchBuiltinFontsFirst" system parameter, which is a boolean parameter which accepts values true and false. In the preferred embodiment "true" represents a Font Priority of "Resident," and "false" represents a Font Priority of "Flash/Disk."

Figure 2:
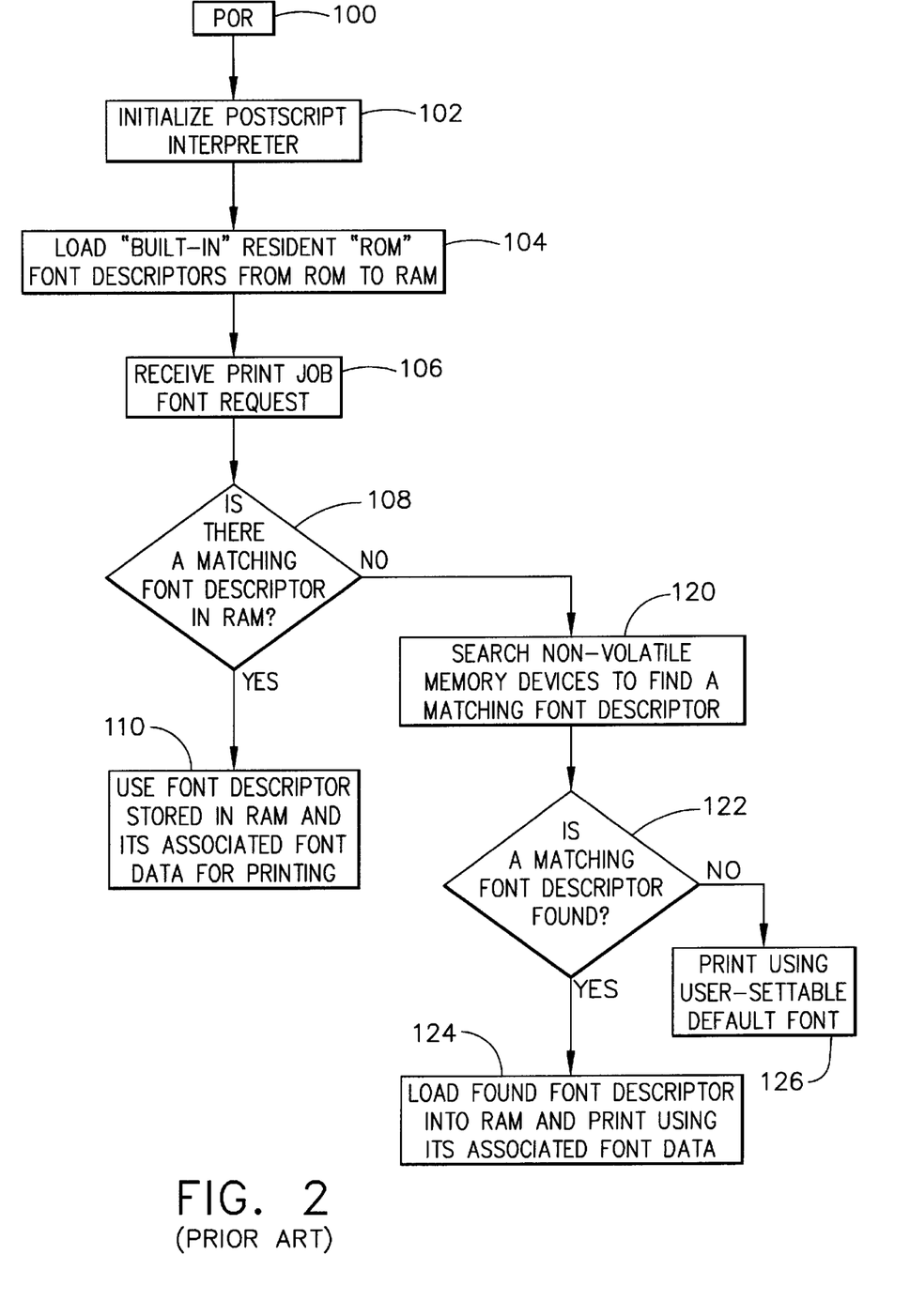
FIG. 2 is a flow chart of the steps performed by a PostScript interpreter to find a resident font stored in a conventional printer known in the prior art.
Figure 3:
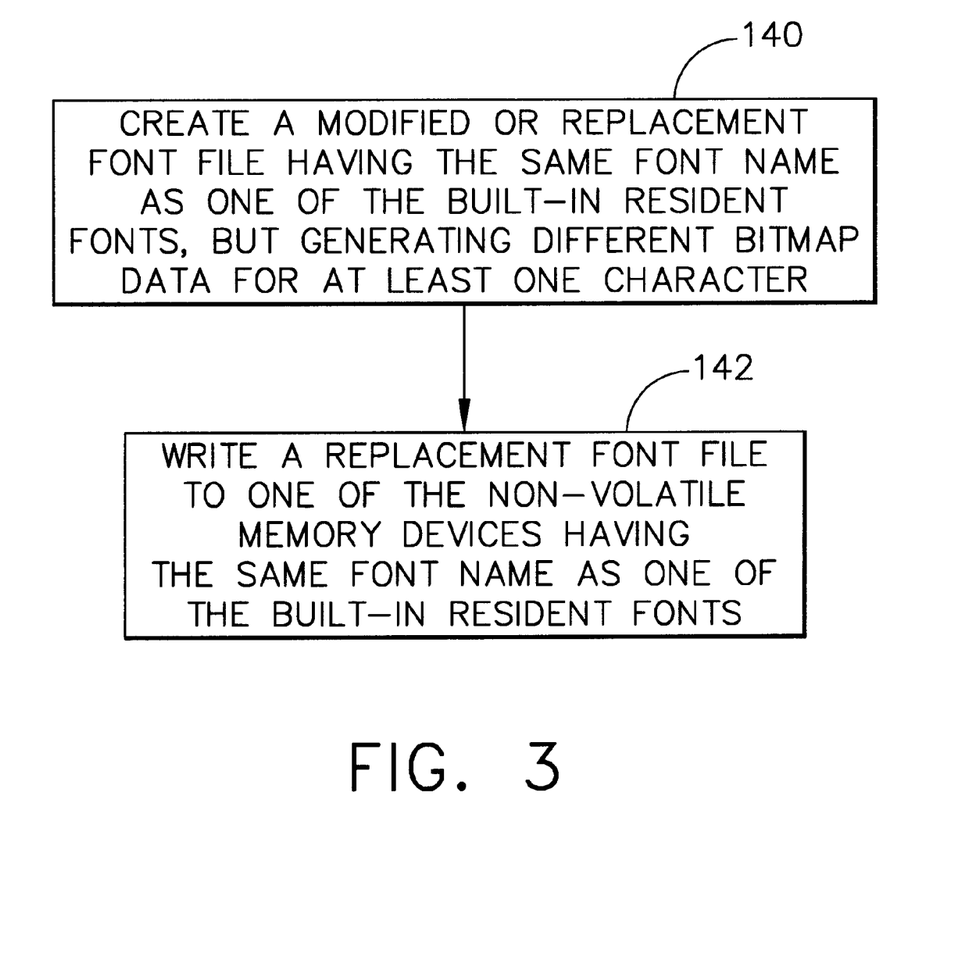
FIG. 3 is a flow chart of initial steps to create a replacement font file, as used in the present invention.
Figure 4:
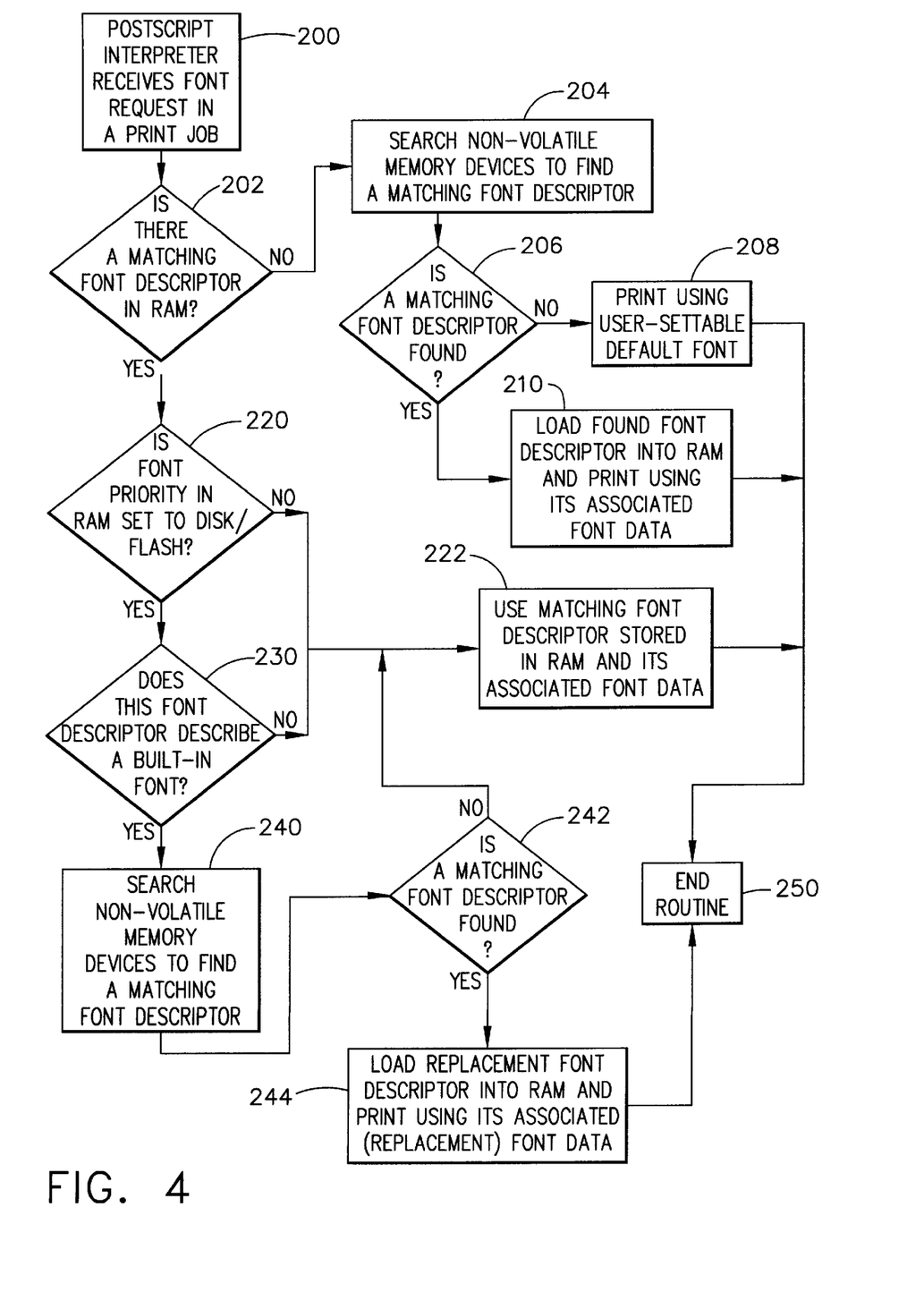
FIG. 4 is a flow chart of the steps performed by an improved PostScript interpreter to find a resident font, or a replacement font, stored in the printer of the present invention.

The logical steps to accomplish the method of the present invention are described in conjunction with the flow charts presented on FIGS. 3 and 4. To begin with, however, a description of some of the operations of a prior art conventional printer are described in a flow chart on FIG. 2. The initial step 100 is a power on reset, which occurs when power is first turned on to the printer, or when its reset button is pressed by a user. After this occurs, the PostScript interpreter will be initialized at a step 102. As that occurs, the "built-in" resident "ROM" font descriptors are copied from the ROM memory device into PostScript virtual memory, at a step 104.

The actual font data involved with these built-in resident fonts can be a large quantity. For example, a recent version of a Lexmark OPTRA S laser printer includes at least 75 built-in resident PostScript interpreter fonts. The font name for these built-in fonts are listed, as follows:

Albertus-Extra Bold

Albertus-Medium

AntiqueOlive

AntiqueOlive-Bold

AntiqueOlive-Italic
Arial
Arial-Bold
Arial-BoldItalic
Arial-Italic
AvantGarde-Book
AvantGarde-BookOblique
AvantGarde-Demi
AvantGarde-DemiOblique
Bookman-Demi
Bookman-DemiItalic
Bookman-Light
Bookman-LightItalic
CG-Omega
CG-Omega-Bold
CG-Omega-BoldItalic
CG-Omega-Italic
CG-Times
CG-Times-Bold
CG-Times-BoldItalic
CG-Times-Italic
CenturySchlbk-Bold
CenturySchlbk-BoldItalic
CenturySchlbk-Italic
CenturySchlbk-Roman
Clarendon-Condensed-Bold
Coronet
Courier
Courier-Bold
Courier-Bold,blique
Courier-Oblique
Garamond-Antiqua
Garamond-Halbfett
Garamond-Kursiv
Garamond-KursivHalbfett
Helvetica
Helvetica-Black
Helvetica-BlackOblique
Helvetica-Bold
Helvetica-BoldItalic
Helvetica-Italic
Helvetica-Light
Helvetica-LightOblique
Helvetica-Narrow
Helvetica-Narrow-Bold
Helvetica-Narrow-BoldItalic
Helvetica-Narrow-BItalic
LetterGothic
LetterGothic-Bold
LetterGothic-Italic
Marigold
Palatino-Bold
Palatino-BoldItalic
Palatino-Italic
Palatino-Roman
SymbolSet
TimesNewRoman
TimesNewRoman-Bold
TimesNewRoman-BoldItalic
TimesNewRoman-Italic
Univers-Bold
Univers-BoldItalic
Univers-Condensed-Bold
Univers-Condensed-BoldItalic
Univers-Condensed-Medium
Univers-Condensed-MediumItalic
Univers-Medium
Univers-MediumItalic
Wingdings
ZapfChancery-MediumItalic
ZapfDingbats.

The next step in the method of the present invention occurs when a font request is received as part of a print job, at a step 106. The printer must then determine whether or not the associated font descriptor is available somewhere within the printer, so that it will be able to print the job with the requested font. At a decision step 108, the printer determines if there is a matching font descriptor stored in RAM (i.e., the PostScript virtual memory). If the answer is YES, then the logic flow is directed to a step 110 where the printer uses the font descriptor stored in PostScript virtual memory and its associated font data for printing this particular job (or portion of a job).

If the answer at decision step 108 is NO, then a step 120 searches the non-volatile memory devices (e.g., hard disk drive, or Flash memory) to look for the matching font descriptor. A decision step 122 determines whether or not a matching font descriptor is found on any of the non-volatile memory devices within the printer. If the answer is YES, then a step 124 loads the found font descriptor into PostScript virtual memory and will print the job (or this portion of the job) using its associated font data. If the answer is NO at decision step 122, then a step 126 will print the print job using a user-settable default font.

As can be seen from FIG. 2, if a matching font descriptor is found in PostScript virtual memory, then that particular font descriptor and its associated font data will be used for printing a job that calls for that particular font. Even if a replacement font by the same descriptor is stored in one of the non-volatile memory devices, that replacement font would not ever be used in the conventional printer described by the flow chart of FIG. 2.

It will be understood that the terminology "font name" and "font descriptor" are virtually identical in meaning, and therefore, these names will be used interchangeably throughout this description. It will also be understood that a "font file" may not entirely consist of pure font data. Instead, a font file could comprise a PostScript command file (i.e., an executable file) that either brings in from another device new data for at least one character for a particular font, or modifies the data of at least one character of one of the fonts already residing on the printer. Such a PostScript command file would produce both a font descriptor and a pointer to the font data. In this instance, the font data would generate a modified or "replacement" bitmap, thereby earning the name "replacement font."

The present invention allows a replacement font to be specified and used in a print job in lieu of one of the built-in resident fonts that already reside in the printer. This will, of course, only be useful if a user desires to use a font descriptor (i.e., font "name") that is the same as one of the built-in resident fonts, while at the same time generating a different bitmap for at least one of the font characters.

Therefore, to use the present invention a modified or replacement font (hereinbelow called a "replacement font") file must be created having the same font name as one of the built-in resident fonts, but generating different bitmap data for at least one of its characters, as per a step 140 on FIG. 3. After this replacement font file has been created, it is then written to one of the non-volatile memory devices at a step 142 on FIG. 3, in which the replacement font file has the same font name as one of the built-in resident fonts.

FIG. 4 is a flow chart of the preferred method steps performed by a PostScript interpreter that operates according to the principles of the present invention. Beginning at a step 200, the PostScript interpreter receives a Font Request command in a print job, which typically would be embedded within the print data of this print job. A decision step 202 then determines whether or not there is a matching font descriptor in the PostScript virtual memory. If the answer is NO, then the logic flow is directed to a step 204 that searches the non-volatile memory devices to find a matching font descriptor. In a decision step 206, if a matching font descriptor is found, a step 210 copies the found font descriptor into PostScript virtual memory and this font will be used to print the job (or a portion thereof). This "Font Request" routine then ends at a step 250. If a matching font descriptor is not found at decision step 206, then a step 208 prints the job using a user-settable default font, and this "Font Request" routine ends at step 250. These steps 204, 206, 208, and 210 are essentially identical to the prior art steps 120, 122, 124, and 126 found on FIG. 2.

If a matching font descriptor is found in PostScript virtual memory at decision step 202, then a decision step 220 determines whether or not the Font Priority setting is set to the value "Disk/Flash." If the answer is NO, then a step 222 uses the matching font descriptor stored in PostScript virtual memory and its associated font data for printing this portion of the job, and this "Font Request" routine ends at step 250.

If the answer was YES at decision step 220, then a decision step 230 determines whether or not this font descriptor is for a built-in font. If the answer is NO, then the logic flow is directed to the step 222 in which the matching font descriptor that is already stored in PostScript virtual memory is used along with its associated font data, and this "Font Request" routine ends at step 250.

If the answer at decision step 230 was YES, then a step 240 searches the non-volatile memory devices (e.g., hard disk drive, Flash memory) in an attempt to find a matching font descriptor. A decision step 242 then determines if a matching font descriptor is found. If the answer is NO, then the logic flow is directed to step 222, and the matching font descriptor stored in PostScript virtual memory and its associated font data are used for printing this portion of the job. This "Font Request" routine then ends at step 250.

On the other hand, if the answer at decision step 242 was YES, then a step 244 loads the replacement font descriptor into PostScript virtual memory and the job (or a portion thereof) is printed using its associated font data, which is the replacement (or modified) data. This last step is unique to the method of the present invention, and an Adobe compatible PostScript Level 2 interpreter can never reach this point. This "Font Request" routine then ends at step 250.

It will be understood that the present invention is useful for emulators or interpreters other than the PostScript interpreter, and that the invention's principles could easily be applied to other types of high-level language printer interpreters which otherwise do not have the necessary flexibility to be able to print a modified or replacement character (or characters) or other symbol except for that which is already maintained in the printer's RAM (such as the RAM font pool cache 33) as a "built-in" font.

It will be also understood that the steps to determine if a Font Priority command has been received, and the types of interfaces used to carry out these steps, that are described hereinabove are only one possible set of logical steps and hardware devices that could be provided to accomplish the goals of the present invention, and that many other configurations could be constructed without departing from the principles of the present invention.

It will be further understood that the exact steps taken, as described hereinabove, to determine if a built-in resident font is being selected or if an alternative memory storage device (such as a Flash memory or a "RAM" disk drive) is being selected by a user, in order to select a particular built-in font or a replacement font, merely comprise one example of a method to implement the present invention, and that many alternative logical methodologies could be used without departing from the principles of the present invention.

It will yet be further understood that the principles of the present invention apply not only to printing systems, but equally to any visual device that is capable of displaying rendered output of a PostScript job. Therefore, the terminology "print engine" also has the meaning of a video display driver, or any other type of imaging or image-forming device.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for providing a replacement font in an image forming system, said method comprising: providing a replacement font stored in a non-volatile memory device having an identical font descriptor as a built-in font that resides in a memory system of an image forming system, but generating a different bitmap pattern for at least one character as compared to said built-in font; and printing or displaying image data by selectably using said replacement font in lieu of said built-in font.

2. The method as recited in claim 1, wherein a descriptor of said built-in font resides in Random Access Memory of said image forming system.

3. The method as recited in claim 2, wherein said Random Access Memory acts as a PostScript virtual memory.

4. The method as recited in claim 1, wherein said non-volatile memory device comprises one of Flash RAM and a hard disk drive.

5. A method for providing a replacement font in an image forming device, said method comprising:

(a) providing a replacement font stored in a non-volatile memory device having an identical font descriptor as a built-in font that resides in a memory system of an image forming device, but generating a different bitmap pattern for at least one character as compared to said built-in font;

(b) allowing a user to choose between said built-in font and said replacement font by use of a "Font Priority" attribute; and (c) printing or displaying image data using said replacement font in lieu of said built-in font if said user selects said replacement font, and printing or displaying image data using said built-in font if said user selects said built-in font.

6. The method as recited in claim 5, further comprising searching a virtual memory of said image forming device to find a pre-determined built-in font if said user selected, by way of said Font Priority attribute, said built-in font, and searching a non-volatile memory of said image forming device to find a pre-determined replacement font if said user selected, by way of said Font Priority attribute, said replacement font.

7. The method as recited in claim 6, wherein said Font Priority attribute modification originates at one of: a host computer keyboard, and a printer control panel.

8. A method for providing a replacement font in a printing system having a memory system for storage of data, a print engine, and a processing circuit that controls the routing of data between said memory system and said print engine; said method comprising:

(a) storing a built-in font in a first area of said memory system, said built-in font having a predetermined font descriptor;

(b) storing a replacement font in a second non-volatile area of said memory system, said replacement font having said identical font descriptor as said built-in font, but generating a different bitmap pattern for at least one character as compared to said built-in font;

(c) receiving a user-entered command that specifies one of said built-in font and said replacement font; and (d) printing a character from the specified one of said built-in font and said replacement font.

9. The method as recited in claim 8, further comprising a step of, upon initialization of said printing system, loading said built-in font from a non-volatile memory device into said first area of said memory system.

10. The method as recited in claim 9, wherein said non-volatile memory device comprises Read Only Memory, and said first area of said memory system comprises Random Access Memory used as a virtual memory.

11. The method as recited in claim 8, wherein said first area of said memory system comprises Random Access Memory.

12. The method as recited in claim 11, wherein said Random Access Memory acts as a PostScript virtual memory.

13. The method as recited in claim 11, further comprising a step of, upon initialization of said printing system, loading said built-in font from a non-volatile memory device into said first area of said memory system.

14. The method as recited in claim 13, wherein said non-volatile memory device comprises one of Flash RAM and a hard disk drive.

15. The method as recited in claim 8, wherein said user-entered command originates at one of: a host computer keyboard, and a printer control panel.

16. A printing apparatus, comprising:

(a) a memory system for storage of data;

(b) a print engine;

(c) a processing circuit that is configured to store a built-in font in a first area of said memory system, and to store a replacement font in a second non-volatile area of said memory system, said built-in font having a predetermined font descriptor, and said replacement font having said identical font descriptor as said built-in font but generating a different bitmap pattern for at least one character as compared to said built-in font; and (d) said processing circuit being further configured to receive a user-entered command that specifies one of said built-in font and said replacement font, and to cause said print engine to print a character from the specified one of said built-in font and said replacement font.

17. The printing apparatus as recited in claim 16, wherein, upon initialization of said printing apparatus, said processing circuit is further configured to load said built-in font from a non-volatile memory device into said first area of said memory system.

18. The printing apparatus as recited in claim 17, wherein said non-volatile memory device comprises Read Only Memory, and said first area of said memory system comprises Random Access Memory used as a virtual memory.

19. The printing apparatus as recited in claim 16, wherein said first area of said memory system comprises Random Access Memory.

20. The printing apparatus as recited in claim 19, wherein said Random Access Memory acts as a PostScript virtual memory.

21. The printing apparatus as recited in claim 20, wherein said non-volatile memory device comprises one of Flash RAM and a hard disk drive.

22. The printing apparatus as recited in claim 16, further comprising a host computer, a printer control panel and a communications port at said printing apparatus, wherein said user-entered command originates at one of said host computer keyboard, and said printer control panel.

23. The printing apparatus as recited in claim 22, wherein said user-entered command is downloaded to said printing apparatus by one of: (a) an NPAP command received through said communications port; (b) a PJL command received through said communications port; (c) a PostScript Level 2 System Parameter received through said communications port; and (d) a PostScript Menu setting of a "Ready" menu group received from said printer control panel.

* * * * *